Dec. 4, 1962   B. HESS ETAL   3,067,331
POCKET DOSIMETER
Filed May 20, 1958

INVENTORS
BERNHARD HESS
ROLF HOSEMANN
HARALD WARRIKHOFF

BY: Toulmin & Toulmin
ATTORNEYS

United States Patent Office
3,067,331
Patented Dec. 4, 1962

3,067,331
POCKET DOSIMETER
Bernhard Hess, Regensburg-Prufening, Rolf Hosemann, Berlin-Grunewald, and Harald Warrikhoff, Berlin-Wilmersdorf, Germany, assignors to Licentia Patent-Verwaltungs-G.m.b.H., Hamburg, Germany
Filed May 20, 1958, Ser. No. 736,631
Claims priority, application Germany May 24, 1957
13 Claims. (Cl. 250—83.3)

The present invention relates to a dosimeter, and more in particular to a pocket dosimeter for measuring the radiation for protective purposes.

It is known to use pocket dosimeters as a measuring device wherever radiation has to be measured for protection. Such devices are used for scientific, industrial, and medical as well as military and civil defense purposes. These known pocket dosimeters have an ionization chamber and an electrometer. The radiation is measured by the electrometer which is discharged via the air ionization chamber according to the ionization or dose of radiation.

These pocket dosimeters require a separate charging device which forms a separate unit or forms a part of the dosimeter. The dosimeter has to be recharged for a determined period prior to each measurement. While this is inconvenient under all circumstances it renders the pocket dosimeter entirely inapplicable for the purposes of civil defense and for military use. Furthermore, the recharging requires a pole projecting from the housing of the pocket dosimeter. This pole must be highly insulated and it must also be protected against radiation and dirt and still it may easily occur that an inaccurate measured value is obtained.

It is an object of the present invention to provide a pocket dosimeter for measuring radiation which is ready to operate at any moment without requiring recharging prior to each operation.

It is another object of the present invention to provide a pocket dosimeter for measuring radiation which forms a compact structure without any contacts projecting therefrom and which is easy to operate and handle.

It is a further object of the present invention to provide a pocket dosimeter for measuring radiation whereby an extremely accurate measured value can be obtained in a simple manner and very quickly.

It is still another object of the present invention to provide a pocket dosimeter for measuring radiation which is particularly suitable for measuring radiation for military and civil defense purposes.

These objects are achieved by the pocket dosimeter of the present invention comprising, in addition to an electrometer a radiation element automatically responding to radiation and supplying a corresponding electromotive force to the electrometer. Since no ionization chamber is used a recharging is not required.

A radiation element, the basic feature of which can be used with advantage in the pocket dosimeter of the present invention, is described in the German patent to Hess, Serial No. 940,847. This radiation element consists of two electrodes each having a different output of secondary rays, i.e., a different electron productiveness. The two electrodes are separated from each other by a highly insulating layer which does not substantially absorb secondary rays. If the electrodes are exposed to radiation, the resulting secondary emission creates an electromotive force which can be used for the measuring operation, the radiation element thus acting as a voltage producing element when subjected to gamma-rays. The voltage is automatically produced in a similar manner as in an accumulator or a galvanic element and as distinguished from ionization chambers or Geiger counters.

The radiation element and the electrometer which, according to the invention, are used in combination can both be disposed, according to a further feature of the invention in a vacuum vessel in which case electrical contacts projecting from the housing in the conventional devices are unnecessary.

Furthermore, the two or several electrodes of the radiation element in the pocket dosimeter of the present invention are shaped, for example, as spherical shells, prisms, cylinders, or the like and are concentrically disposed so as to give the pocket dosimeter substantially an equal sensitivity with respect to primary radiation in the range of a comparatively great aperture angle.

According to a further, preferred embodiment of the present invention, means are provided for switching the electrometer from the short-circuit position to the measuring position and vice versa and for switching on and off a plurality of resistances so as to use the device at will either as a dosimeter or as a dose output meter and to use the device in a plurality of different ranges of sensitivity.

The present invention will be more fully appreciated upon the following description of the accompanying drawings, wherein.

Figure 1:
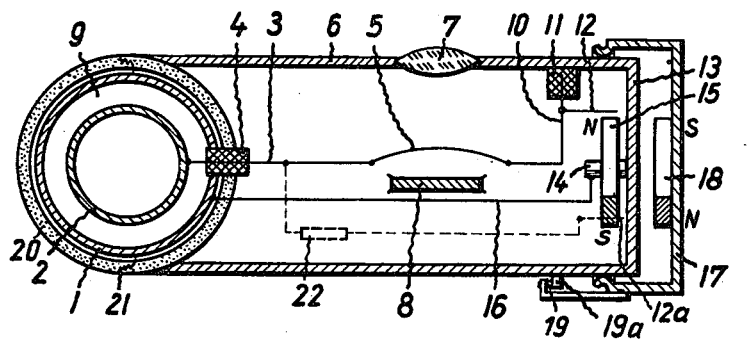
FIGURE 1 is a sectional view of the pocket dosimeter of the present invention.
Figure 2:
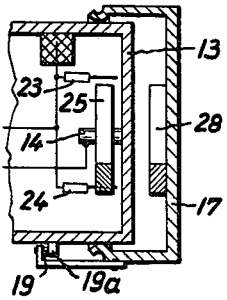
FIGURE 2 is a sectional view of a portion of the pocket dosimeter of the present invention illustrating the means for switching the device so as to operate in various ranges of sensitivity.

Referring now to the drawings somewhat more in detail, the pocket dosimeter of the present invention comprises a radiation element having a first electrode 1 and a second electrode 2 which may have the form of spherical shells and are concentrically disposed relative to one another. In the space 9 between the electrodes 1 and 2 there may be provided a solid insulating mass, but preferably a high vacuum is used as an insulator. The voltage of the interior electrode 2 is transmitted to the electrometer via a lead 3 passing through the insulation 4. The materials of which the electrodes 1 and 2 are respectively composed are so chosen that the electrode 2 has a high output of charge carriers produced by the received primary radiation whereas the electrode 1 has a much smaller yield of secondary charge carriers. Of course, the difference in production of charge carriers increases with increasing radiation. Materials having a high yield of secondary charge carriers are materials having a high atomic number in the periodic system. The electrode 2 may thus be composed, for example, of gold, thorium, platinum, lead, nickel, and related materials in the periodic system having a high atomic number. It is, of course, also possible to use alloys of such materials or several materials arranged in two or several layers or several materials which are powdered, mixed, and compressed. The electrode 1 is composed of materials having a low atomic number as, for example, carbon, beryllium, aluminum, and the like materials of the periodic system having a low atomic number.

The lead 3 is connected with the electrometer wire 5. Both the electrodes 1 and 2 and the electrometer wire 5 are housed in the high vacuum vessel 6 in which there is provided a magnifying lens 7 through which the deflection of the electrometer wire 5 relative to a measuring scale 8 can be observed.

In operation, the radiation to which the device is exposed results in a different output of charge carriers of the two electrodes 1 and 2 and the capacity determined by the intensity of radiation will cause a predetermined deflection of the electrometer wire 5 with respect to the gauged scale 8 which can be observed through the magnifying lens 7.

In the measuring operation, only the volume 9 between the two concentric shells 1 and 2 should determine the deflection of the electrometer wire 5 and it is therefore necessary to provide the vessel 6 with walls composed of impermeable material with respect to radiation. The same result can be accomplished in a more simple manner by composing the electrometer of materials having the identical yield of secondary charge carriers within the operative range of radiation. With other words, the electrometer should be composed of materials having a substantially identical atom number or an identical medium atomic number.

Furthermore, the composition of the two electrodes 1 and 2 is so chosen that within a determined frequency range the high voltage radiation element has a sensitivity which for all practical purposes is independent from the prevailing frequency of radiation. This end is achieved by making electrode 1 of a thin layer of a material having a low atomic number, as, for example, carbon, aluminum, beryllium, whereas the electrode 2 is comparatively thick and of a material having a high atomic number.

The measurement is also preferably independent from the direction of radiation which can be achieved by using electrodes having the shape of a spherical shell, as shown in the drawings.

The secondary emission of the electrodes 1 and 2 can be varied by the cap 20 having the same configuration as the electrode and therefore being shaped as a spherical shell in the example shown in the drawings. It is provided with a threading 21 and therefore can easily be replaced by another cap composed of a different material. A cap 20 of a determined material will receive the primary radiation, the hard component of which (neutron- or γ-radiation) produces a secondary radiation to which the correspondingly adjusted electrodes 1 and 2 respond. By removing the cap and adding another cap the dosimeter can be adjusted to various kinds of radiation. Another cap is slightly radioactive and corresponds to the predetermined current standard with which the sensitivity of the device can be checked or if it has changed it can be found again.

The sensitivity of measurement can be reduced by deteriorating the insulating. It can be so adjusted that zero radiation is indicated in case of a determined radiation, for example a maximum permissible radiation.

The pocket dosimeter of the present invention can be switched on and off its operative position by the following arrangement:

The electrometer wire 5 is connected to the insulation 11 by the metal wire 10 and is provided with an insulated stop pin 12. A stud 14 is mounted in the bottom portion 13 of the high vacuum vessel 6 and supports a rotatable permanent magnet 15. This magnet is connected to the second electrode of the electrometer and electrode 1 of the high voltage radiation element via the lead 16. The bottom portion 13 of the high vacuum vessel 6 is covered by a rotatable cap 17 having at its inner side a permanent magnet 18 which is positioned relative to the permanent magnet 15 in such a manner that the north pole of magnet 15 is opposite the south pole of magnet 18 and the south pole of magnet 15 is opposite to the north pole of magnet 18. By turning the cap 17 with its magnet 18 the magnet 15 can be turned until it comes into contact with stop pin 12. In this position the electrometer wire 5 is grounded and therefore in its inoperative position. A stop 19 and a stud 19a mounted on the cap 17 and the vessel 6, respectively, maintain the device in this position even if moved and carried in a pocket. Upon unlocking and turning the cap 17 the magnet 15 is removed from the stop pin 12 and the pocket dosimeter is in its operative position and ready to effect a measurement.

The pocket dosimeter heretofore described can be easily adapted for use as a dose-output meter. For this purpose an ohmic resistance 22 is connected in parallel with the two poles 12 and 14 of the electrometer. The deflection of the electrometer wire is proportional to the current flowing through the resistance 22. This current depends, in turn, on the number of charge carriers per second produced in the electrodes 1 and 2. This number of charge carriers per second is proportional to the intensity of radiation or dose-output.

By employing the electromagnetic coupling 15, 18, or 25, 28, it is possible to switch in one such ohmic resistance and one or several leakage resistances such as the resistances 23 and 24. The device can then be used at will as a dosimeter and as a dose-output meter.

FIGURE 1 shows, for example, the position of the magnet 15 in contact with the stop pin 12a connected with the ohmic resistance 22. If it is turned by 90° it is used as a dosimeter, and in the position shown in FIGURE 1 in which the magnet 15 is in contact with stop pin 12a the device serves as a dose-output meter. If the magnet is turned by 180° the magnet 15 comes into contact with stop pin 12 and the device is in its inoperative position. By switching in one or several leakage resistances the dose-output meter can be switched to operate at various degrees of sensitivity.

It will be understood that this invention is susceptible to modification in order to adapt it to different usages and conditions, and, accordingly, it is desired to comprehend such modifications within this invention as may fall within the scope of the appended claims.

What we claim is:

1. A pocket dosimeter for measuring X-rays, gamma-rays and neutron-rays, comprising, in combination: an evacuated high-vacuum vessel containing two spaced concentric electrodes one arranged within the other, said electrodes being made of materials of different electron productiveness so as to constitute a voltage producing element whenever subjected to radiation thereby generating a voltage, increasing with increasing radiation intensity, and an electrometer electrically connected to said electrodes.

2. A pocket dosimeter as defined in claim 1 wherein said electrodes are spherical.

3. A pocket dosimeter as defined in claim 1 wherein said electrodes are cylindrical.

4. A pocket dosimeter as defined in claim 1 wherein said electrodes are prism-shaped.

5. A pocket dosimeter as defined in claim 1 wherein said electrometer is also arranged within said vessel, whereby all electrical connections are located interiorly of said vessel.

6. A pocket dosimeter as defined in claim 1 wherein the material of which one of the two electrodes is made is a material having a high atomic number and wherein the material of which the other of the two electrodes is made is a material having a low atomic number.

7. A pocket dosimeter as defined in claim 1, said vessel including a removable cap covering said electrodes, said cap being made of a material producing a predetermined secondary emission if exposed to primary radiation.

8. A pocket dosimeter as defined in claim 1 wherein the materials of which said electrodes are made are so selected that in a given spectral range the dosimeter is sensitive to radiation irrespective of the wave length.

9. A pocket dosimeter as defined in claim 1 wherein the self-discharging characteristics of said voltage producing element are so selected that zero radiation is indicated in case of a certain predetermined radiation.

10. A pocket dosimeter as defined in claim 1 further comprising a resistor electrically connected in parallel with said electrometer and being also disposed in said vessel, whereby a direct reading of dose-output may be obtained.

11. A pocket dosimeter for measuring X-rays, gamma-rays and neutron-rays, comprising: an evacuated high vacuum vessel; a first electrode disposed in said vessel;

a second electrode in said vessel disposed concentrically with respect to and being made of material having a different electron productiveness as compared with said first electrode, said two electrodes constituting a voltage generating element when subjected to radiation, said voltage increasing with increasing radiation intensity; an electrometer connected to said electrodes, electric circuit means including switching means having connecting and separating position for electrically connecting and separating, respectively, said two electrodes; a manually operating adjustment device, and coupling means for rendering the position of said switching means responsive to the position of said adjustment device.

12. A pocket dosimeter as set forth in claim 11, said electric circuit means including at least one resistor to be placed in circuit with said electrodes across said electrometer when said switching means has a connecting position.

13. A pocket dosimeter as set forth in claim 11; said coupling means including a first magnet secured to said adjustment device; and a second magnet in magnetical coupling relationship with said first magnet following the motion thereof and being secured to said switching means for movement thereof.

References Cited in the file of this patent

UNITED STATES PATENTS

| | | |
|---|---|---|
| 2,708,242 | Ruben | May 10, 1955 |
| 2,802,113 | Ohmart | Aug. 6, 1957 |

OTHER REFERENCES

Radiation Dosimetry, by Hine et al., Academic Press Inc., New York, 1956, page 210.